J. O. MORRISON.
SPEED MEASURE.
APPLICATION FILED JAN. 16, 1905. RENEWED MAR. 15, 1911.
995,412.
Patented June 13, 1911.
2 SHEETS—SHEET 1.
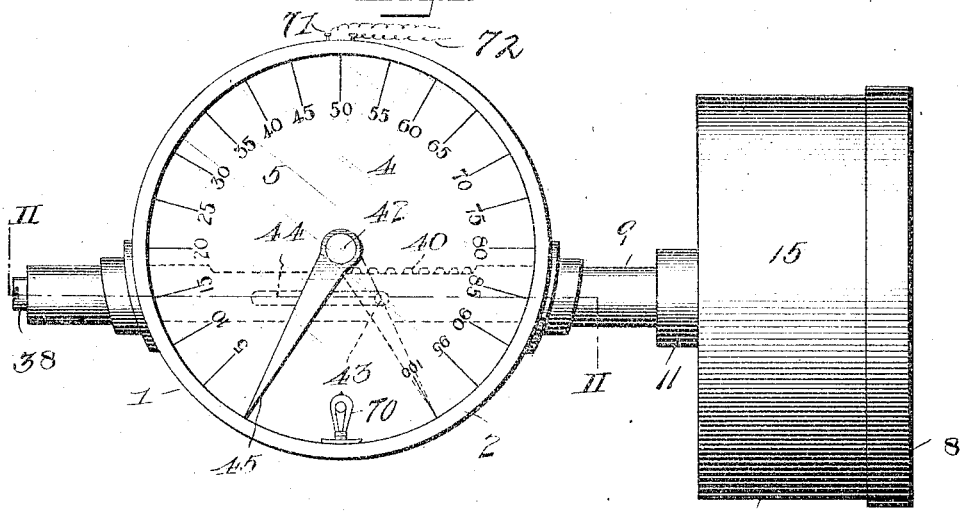
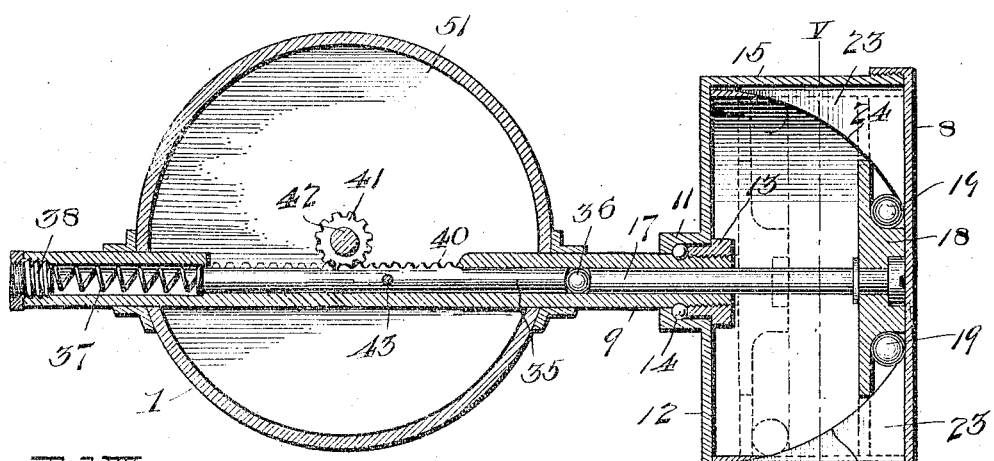
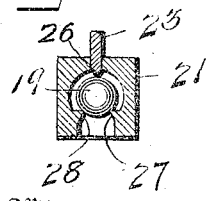

J. O. MORRISON.
SPEED MEASURE.
APPLICATION FILED JAN. 16, 1905. RENEWED MAR. 15, 1911.
995,412.
Patented June 13, 1911.
2 SHEETS—SHEET 2.
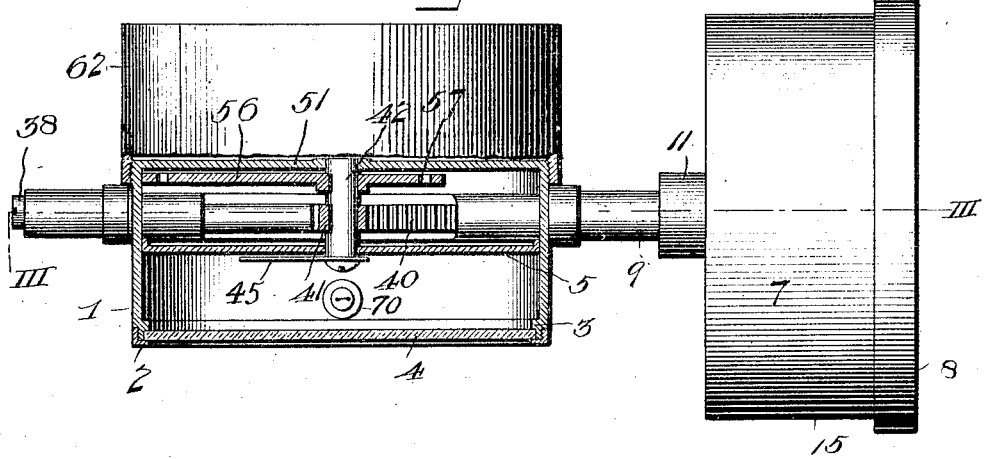
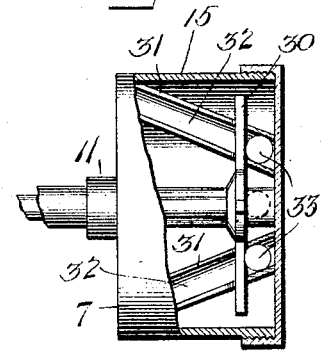
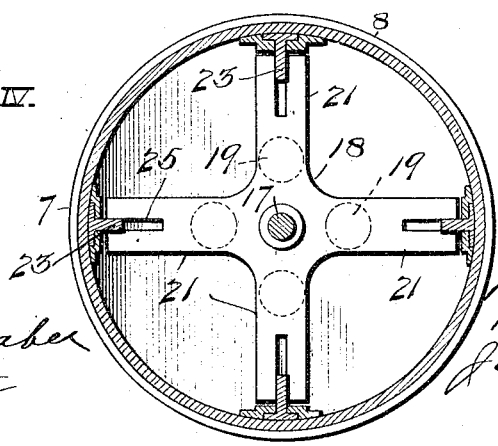

UNITED STATES PATENT OFFICE.

JOSEPH O. MORRISON, OF ANDERSON, INDIANA, ASSIGNOR OF ONE-FOURTH TO FRANK J. KENT, OF NEW YORK, N. Y.

SPEED-MEASURE.

995,412.  Specification of Letters Patent.  Patented June 13, 1911.

Application filed January 16, 1905, Serial No. 241,294. Renewed March 15, 1911. Serial No. 614,702.

*To all whom it may concern:*

Be it known that I, JOSEPH O. MORRISON, of Anderson, in the county of Madison, State of Indiana, have invented certain new and useful Improvements in Speed-Measures, of which the following is a specification.

My invention relates generically to improvements in mechanism, of which centrifugal speed governors for engines are a familiar example, for converting rotary into reciprocatory motion, through the employment of centrifugal force, and specifically, comprises machines for the measurement of speed of rotation, of revolving bodies, wherein the reciprocatory movement obtained through the conversion aforesaid and bearing a definite relation to the rotary motion from which it is derived, is indicated.

In machines for converting rotary into reciprocatory motion, through the employment of centrifugal force, generally it may be observed that while the rotative movement is continuous in one direction, irrespective of variations in speed, the reciprocatory movement derivable therefrom is not only limited as to its maximum extent in one direction, but plays back and forth in opposite directions in response to variations in the speed of rotation from which it is derived. A limit, comparatively restricted at best, of reciprocatory movement in opposite directions derivable from the means referred to is imposed by the extent of movement of the members susceptible to actuation under direct impulse of centrifugal force. It is therefore a desideratum in machines of the aforesaid general class, to secure maximum movement of the centrifugal actuating members within a minimum field of operation. The attainment of this object my invention is designed to accomplish.

In speed measuring instruments especially a maximum limit of reciprocatory movement referred to is of peculiar importance, because it affords, by the aid of simple and direct connections, a wider indicator-sweep, and a practicability of wide and easily read graduations upon a dial plate of desirably small diameter. In speed measuring instruments it is also practically essential to procurement of the requisite sensitiveness of operation in the machine, besides the desirability of reduction of the instrument to small compass, to employ, as centrifugal actuating-members, ponderable bodies of the minimum weight which may respond promptly and efficiently to the impulse of centrifugal force. This also is one of the objects attained by my invention.

Heretofore, in mechanism of the class specified, the centrifugal actuating-members employed have been made to operate in a plane at right angles to their common axis of rotation. By my invention, through a material interposition, I effect the application of the force resultant from the generation of centrifugal force directly against the reciprocatory member or converter of my machine. By that means, I am enabled to substitute direct action for indirect agency, with the result of greatly simplifying the instrumentalities necessarily employed to attain the object in view.

Having hereinbefore indicated in a general way some of the objects of my invention, I shall now proceed to describe the same in detail, and in the appended claims to succinctly specify what constitutes my invention.

In the accompanying drawings, which constitute part of this specification, and wherein I have illustrated certain forms of embodiment of my invention as applied to an instrument for measuring speed of a rotative body: Figure I is a side elevation of a speed indicator embodying my invention, looking toward the dial; Fig. II is a section on the line II—II of Fig. I, but partly in elevation; Fig. III is a section on the line III—III of Fig. II, some of the parts being shown in elevation, the centrifugal members being shown at rest in full lines, and near their limit of movement in dotted lines; Fig. IV is a section on the line V—V of Fig. III, looking toward the converter head of the instrument; Fig. V is a diametrical section, partly in elevation, of the driving case of my instrument, illustrating in elevation an embodiment of my invention slightly modified as to form of the converter head and centrifugal member tracks; Fig. VI is a perspective view of the converter head shown in Figs. III and IV, detached; Fig. VII is a diagrammatical illustration of a slight modification of the converter head and guide member.

In every form of its embodiment my invention comprises a relatively stationary member and, in operative relation to the stationary member, a rotative member, the latter being designed and adapted to afford that rotary movement which it is the object of my invention to convert into reciprocatory movement, and the former to afford a point of departure and an indicator, from which and upon which, respectively, the rotative movement aforesaid may be measured and legibly exhibited.

Referring to the numerals on the drawings, 1 indicates the stationary member of my invention, embodied in the form of an instrument for measuring speed of rotation. It perferably consists of a cylindrical metallic box adapted to be secured by a bracket, or any suitable means, not shown, to some body or member that is relatively fixed to the rotative body whose speed of rotation it is intended that the instrument shall measure. Obviously, the members of the general class described are numerous, a familiar example being the well known motor vehicle. The box 1 is preferably provided with an annular screw cap 2, adapted to secure within the face of the box, as against an annular flange 3, a glass faceplate 4, employed, by reason of its transparency, to protect and at the same time exhibit the face of a dial 5 suitably mounted and secured within the box.

7 indicates the rotative member above referred to as forming one of the essential members of my invention. It preferably consists of a cylindrical metallic case, closed and perfectly protected as by a screw cap 8. The case 7 is assembled with perfect freedom of revolubility, so far as the same is practically attainable, with the box 1, the means illustrated for the purpose being a hollow bearing member 9 which, extending across the box 1 and preferably beyond the sides thereof, is secured thereto. The means of revolubly securing the case to the box is preferably a ball-bearing, which may be conveniently formed by an inwardly flanged collar 11, projecting from the end plate 12 of the case, and secured in place as by a screw-collar 13 threaded to the end of the bearing member 9. A ring of balls 14 confined by the collar 13 against the bearing member 9 and the flange of the collar 11, suitable bearing faces upon the members specified being provided for the purpose, serve to properly assemble the parts. The connection between the case 7 and the bearing member 9 is illustrated as a coaxial one, but that is obviously susceptible of variation. The case 7 is designed and adapted, through operative contact, as between its tread 15 and the periphery of a rotative body whose peripheral speed of rotation is to be measured, to derive motion from said rotative body. If therefore the tread 15 be brought into operative frictional engagement with the periphery of a rotating body, as for example the tire or available surface of a motor vehicle, the case 7 will be caused thereby to revolve at a determinate speed, proportionate to the respective radii of the case and the rotative body aforesaid, according to principles well understood in the art. In order to reduce to measurement and legibly exhibit the measurement when obtained, I employ, to begin with, means for converting the rotative movement of the case 7 into relative reciprocatory movement of a member which, for convenience of identification, I designate a converter, comprising essentially an endwise movable member or rod 17 working loosely within the bore of the bearing member 9, and provided upon its free end within the case 15 with an impulsive member or head 18.

The impulsive member 18 is so called because it receives direct impulse from the centrifugal members 19 which, driven away from the axis of the rod 17 by centrifugal force, are caused, preferably through direct engagement with the head 18, to impart to the rod 17 an impulse which tends to force it from the case 7 into the bore of the bearing member 9. Provision must be made of means which acting in opposition to the said force in order to render it regularly and continuously available, shall yieldingly tend to drive the rod 17 in the opposite direction. This end may be accomplished through the employment of a suitable compensating spring, hereinafter specified.

Assuming that the normal position of the end of the rod 17 or head 18 thereof against the cap be yieldingly maintained, the centrifugal member or members 19, if more than one are employed, may be confined therewith in a centripetal position about the end of the rod 17 or head 18 thereof, whence they may be driven outward upon due application of centrifugal force. The centrifugal members 19 are thus confined in effect by a sensitive spring balance, ready promptly and efficiently to respond to a preponderance of centrifugal force communicated to them. It is by reason of the necessity for yieldingly confining the centrifugal members 19 into a normal position that said members should be made, although of a weight sufficient to render them promptly responsive to the application of centrifugal force, of the minimum weight consistent with the performance of their function, in order that a weak and sensitive spring may be employed to hold them counterbalanced into position available for operation. They therefore preferably consist of one or more, and preferably a plurality, of steel spheres or balls, having a diameter of the fractional part of an inch.

The means for mounting the ball or balls 19 within the case 7 in operative proximity to the converter, are susceptible of considerable variation. It is desirable that said means should be such as will serve to effectively guide the movement of the balls, and at the same time offer the least resistance to the freedom of movement of the latter. For example, the head 18 may be provided with one or more radial hollow arms 21, of which four are illustrated in Figs. III and IV of the drawings. Each of the arms 21 is provided with a radial, preferably open-ended bore, which loosely accommodates a ball 19. Assembled with the case 7 within the hollow arms 21 of the head 18 the balls are free to travel from end to end of their respective arms, but through the interposition of suitably constructed and disposed guide members 23 provision may be made not only for confining the balls in the normal centripetal position shown in Fig. III, and for imparting to them a maximum extent of movement under action of centrifugal force, but also for allowing the balls an extent of movement which is the resultant of the centrifugal force and the opposing resistance offered by head 18, together with its arms 21. The result is motive impulse imparted to the converter, which, though necessarily oblique to its axis of reciprocation, is nevertheless direct and positive. This is one of the distinct features of my invention, as contradistinguishing it from attempts made to utilize the movement of centrifugally actuated balls against inclined planes or wedges, carried in the converter head, whose operation is not only unsatisfactory in practice, owing to excessive friction, and other causes, but is also so far limited in extent of motion practically derivable therefrom as seriously to impair the accuracy of any instrument in which they are embodied as a part.

The members 23 may be, for convenience of assembling the parts, mounted upon the cap 8 of the case 7, and each is provided with a guide face or edge 24, whose presence determines the function of the member 23. The disposition of the guide-edge 24 may be, for example, such as is clearly illustrated in Fig. III, for instance, and it is brought into operative engagement with the ball 19 which travels upon it, through the presence in the arm 21 of a kerf 25, provided for the accommodation of the member 23. It will be seen, therefore, that the length of the guide-face or faces 24 determines the extent of movement of the ball or balls 19, and that consequently the extent of said movement may be increased or diminished by varying the width of the tread 15, rather than the diameter of the case 7, which is advantageous in practice.

With a view to the elimination of friction between the balls 19 and the tracks whereon they move, I show diagrammatically in Fig. VIII a knife edge 26 upon the member 23, coöperating with knife edge tracks 27 and 28 projecting as beads from the inner wall of the bore of the arm 21, between which a ball 19 may be operatively confined with the minimum of resultant friction from its engagement with the members which confine it. In Figs. III and IV, above referred to, the balls 19 are shown as confined within the arms 21, traveling loosely upon the guide faces 24 of guide members 23. Fig. V illustrates substantially a reversal of this arrangement, in which a converter head is shown as provided with radial fingers 30, which work in kerfs 31 provided for them in tubular guide pieces 32 provided within the case 7. By this arrangement the centrifugal balls, indicated in said figure by the numerals 33, are assembled with the case 7 within the tubes 32, instead of within the converter head 18, as previously specified, but the operation of said two forms of embodiment of the principle of my invention is substantially identical.

From the foregoing description it becomes apparent that the converter with its rod 17 is rotatively assembled with the case 7. To altogether eliminate, that is to say, completely convert said rotative movement, I provide within the bore of the member 9 a converter rod-section 35, which is operatively connected with, but segregated from, the rod 17 as by the interposition of a spherical idler 36. The presence of the idler 36 serves to permit free rotative movement of the rod 17, independently of the rod-section 35, and at the same time to perfectly transmit endwise movement from one to the other. The rod-section 35 being therefore in effect, so far as reciprocatory movement is concerned, an extension of the converter rod 17, I apply against the free end of said rod-section a counterbalancing spring 37, previously alluded to, and confine it within the bore of the bearing member 9 by an abutment screw 38, preferably made of sufficient length to afford requisite means of adjustment of the expansive force of the spring, whereby the force of said spring may be brought to a nice balance to support the weight of the balls 19 in their centripetal position illustrated in Fig. III.

To render the movement of the converter rod-section 35 legibly visible against the face of the dial 5, I am enabled by the extent of reciprocatory movement derivable from the instrumentalities which I employ, to make use of the direct and simple connection illustrated in the drawings, and thereby to eliminate certain chances of error which accumulatively present themselves in complex indicating mechanism. The simple mechanism which I prefer to employ, and which perfectly answers the purpose, is a rack 40, engaging with a pinion 41 secured to an arbor 42 mounted in suitable bearings provided for it within the box 1. The slightest possible rotative movement in the converter rod-section 35 may be prevented by engagement of a pin 43 projecting from the side of the section 35, and extending into an oblong slot 44 in the bearing member 9, the slot 44 being of a longitudinal extent equal to or greater than that of the reciprocatory movement of the converter. The arbor 42 carries upon its end which projects through the dial 5 an indicator needle 45, which is adapted through impulse derived from the reciprocatory movement of the converter rod-section 35 to make a complete revolution over the face of the dial. The sweep of the needle may be graduated in any preferred numerals upon the face of the dial, as illustrated, for example, in Fig. I, the position in full lines of the needle 45 being that at which it indicates zero. In graduating the dial from the zero point, the case 7 may be by test driven up to a calculated maximum, and intermediate graduations determined and inscribed upon the dial plate, the intermediate graduations being of course subject to repetitions of the test above suggested, at intermediate rates between zero and the maximum.

In order to render the indication legible at any time, day or night, I prefer to provide upon the transparent face plate 4, a series of opaque characters or figures as illustrated in Fig. I, underneath which the needle 45 sweeps, said figures being directly opposite to and in correspondence with the figures on the dial 5, if the latter be employed. Obviously, only one or the two series of figures referred to may be employed as preferred. The figures of the series upon the plate 4 are preferably cut into the plate, and are filled with a suitable opaque material. Within the box, as for example, between the dial 5 and plate 4 (compare Figs. I and II) I provide in connection with a figured glass plate, like the plate 4 above described, a suitable illuminating agent or lamp, for instance a small incandescent electric light bulb 70, which may be supplied with energy from any suitable source, not illustrated, as by line wires 71 and 72, shown in Fig. I. The electric energy supplied through conductors 71 and 72 may be switch-controlled in the usual way and thrown on or off as often as required.

Deeming it unnecessary in this instrument, addressed to those skilled in the art to which my invention relates, to offer any further description of the mode of operation of my invention than what is afforded in the foregoing specification, I would have it distinctly understood that I do not intend in this specification to limit myself in any wise to any details of construction. I have herein endeavored in some measure to point out certain modifications of form which readily suggest themselves, but rely mainly upon the clear explication of the principle of my invention to secure that degree of protection to which my claims entitle me under the law, in view of the subsisting state of the art.

What I claim is:—

1. In a speed measurer and indicator, the combination with a relatively stationary member and a rotary member operatively connected therewith, of a reciprocatory member, centrifugally operative means carried by said rotary member, connections between said means and said reciprocatory member and curved guides within said rotary member to cause said means to move longitudinally as well as radially of said rotary member.

2. In a speed measuring instrument, the combination with its stationary member and rotative member case, of an endwise movable converter rod, and means for indicating its movements, a converter head upon the end of said rod within the case, a kerfed arm provided with a bore within said head, a guide member upon the case accommodated within said kerf, and a ball constituting a centrifugal actuating member, movably confined by said guide member within the bore of the converter head.

3. In a speed measurer and indicator, the combination with its stationary member and rotative member of an endwise movable converter rod, and means for indicating its movements, a converter head upon the end of said rod within the case, a kerfed arm provided with a bore within said head, an inclined guide member upon the case accommodated within said kerf, and a ball constituting a centrifugal actuating member, movably confined by said guide member within the bore of the converter head.

4. In a speed measurer and indicator, the combination with a stationary member and rotative member case, of an endwise movable converter rod, an indicator operatively connected therewith and carried by said stationary member, a converter head upon the end of said rod within the case, a kerfed arm provided with a bore within said head, a ball constituting a centrifugal actuating member within the bore of said arm, and a guide member upon the case accommodated within the kerf operatively engaging said ball, and so curved that for equal changes in the rapidity of rotation of the rotative member case said indicator will pass over equal angular distances.

5. In a speed measuring instrument, an indicator, a pair of members mounted to revolve together, one of said members being endwise movable relatively to the other member, the endwise movable member being operatively related to said indicator, one of said members having a plurality of radially extending substantially cylindrical unobstructed centrifugal-member-carrying channels constructed to prevent lateral displacement of the centrifugal members while leaving said centrifugal members free to revolve therein and permitting movement of said centrifugal members longitudinally of the channels, said channels being open-ended, said member being also provided with a plurality of open ended slots arranged in pairs, one pair for each channel, the slots of each pair cutting through the walls of the corresponding channel on opposite sides coincidently with the axis thereof, a centrifugal member in each of said channels shaped conformably with the channel; the other of said members being provided with a plurality of radially disposed arms, each of which enters the open ended slots of one of said channels and forms an end closure for the channel, the inner surfaces of said arms being inclined with respect to the axis of revolution of said pair of members, so that when the two relatively endwise movable members are revolved together, said centrifugal members acting through centrifugal force, will engage said arms and compel a relative endwise movement between said two members.

6. In a speed measuring instrument, an indicator, a pair of members mounted to revolve together, one of said members being endwise movable relatively to the other member, the endwise movable member being operatively related to said indicator, one of said members having a plurality of radially extending substantially cylindrical unobstructed ball carrying channels constructed to prevent lateral displacement of balls while leaving the balls free to revolve therein and permitting movement of the balls longitudinally of the channels, said channels being open-ended, said member being also provided with a plurality of open-ended slots arranged in pairs, one pair for each channel, the slots of each pair cutting through the walls of the corresponding channel on opposite sides coincidently with the axis thereof, a plain ball in each of said channels, the other of said members being provided with a plurality of radially disposed arms, each of which enters the open ended slots of one of said ball channels and forms an end closure for the channel, the inner surfaces of said arms being inclined with respect to the axis of revolution of said pair of members, so that when the two relatively endwise movable members are revolved together, said balls, acting through centrifugal force, will engage said arms and compel a relative endwise movement between said two members.

7. In a speed measuring instrument, an indicator, a pair of members mounted to revolve together, one of said members being endwise movable relatively to the other member, one of said members having an axial pin, and the other being provided with an axial bore within which said pin is slidable, the endwise movable member being operatively related to said indicator, one of said members having a plurality of radially extending substantially cylindrical unobstructed ball carrying channels constructed to prevent lateral displacement of balls while leaving the balls free to revolve therein and permitting movement of the balls longitudinally of the channels, said channels being open ended, said member being also provided with a plurality of open ended slots arranged in pairs, one pair for each channel, the slots of each pair cutting through the walls of the corresponding channel on opposite sides coincidently with the axis thereof, a plain ball in each of said channels, the other of said members being provided with a plurality of radially disposed arms, each of which enters the open ended slots of one of said ball channels and forms an end closure for the channel, the inner surfaces of said arms, being inclined with respect to the axis of revolution of said pair of members, so that when the two relatively endwise movable members are revolved together, said balls, acting through centrifugal force, will engage said arms and compel a relative endwise movement between said two members.

8. In a speed measuring instrument, an indicator, a pair of members mounted to revolve together, one of said pair of members being fixed against movement of translation relatively to the other and the other member being movable relatively to the first of said pair of members, said relatively movable member being operatively related to said indicator, one of said pair of members having a plurality of radially extending centrifugal member-carrying channels adapted to accommodate centrifugal members, a centrifugal member in each of said channels having its axes free for rotation and translation therein, the other of said pair of members being provided with a plurality of arms each of which passes through one of said channels, the inner surfaces of said arms being inclined with respect to the axis of revolution of said pair of members, so that when said members are revolved said centrifugal members, acting through centrifugal force will engage said arms and compel a relative movement between said pair of members.

9. In a speed measuring instrument, an indicator, a pair of members mounted to revolve together, one of said pair of members being fixed against movement of translation relatively to the other and the other member being movable relatively to the first of said pair of members, said relatively movable member being operatively related to said indicator, one of said pair of members having a plurality of radially extending centrifugal member-carrying channels adapted to accommodate centrifugal members, a centrifugal member in each of said channels having its axes free for rotation and translation therein, the other of said pair of members being provided with a plurality of arms each of which passes through one of said channels, the inner surfaces of said arms being inclined with respect to the axis of revolution of said pair of members, so that when said members are revolved said centrifugal members, acting through centrifugal force, will engage said arms and compel a relative movement between said pair of members, and means opposing such relative movement.

10. In a speed measuring instrument, an indicator, a pair of members mounted to revolve together, one of said pair of members being fixed against movement of translation relatively to the other and the other member being movable relatively to the first of said pair of members, one of said members having a pin, and the other being provided with a bore in which said pin is slidable, said relatively movable member being operatively related to said indicator, one of said pair of members having a plurality of radially extending centrifugal member-carrying channels adapted to accommodate centrifugal members, a centrifugal member in each of said channels having its axes free for rotation and translation therein, the other of said pair of members being provided with a plurality of arms each of which passes through one of said channels, the inner surfaces of said arms being inclined with respect to the axis of revolution of said pair of members, so that when said members are revolved said centrifugal members, acting through centrifugal force, will engage said arms and compel a relative movement between said pair of members.

11. In a speed measuring instrument, an indicator, a pair of members, one of which is rotatable, one of said pair of members being fixed against movement of translation relatively to the other and the second member being movable relatively to the first of said pair of members, said relatively movable member being operatively related to said indicator, a rotatable one of said pair of members having a plurality of radially extending centrifugal member-carrying channels adapted to accommodate centrifugal members, a centrifugal member in each of said channels having its axes free for rotation and translation therein, and parts extending into said channels and compelling relative movement of said relatively movable member when the centrifugal members, acting through centrifugal force, engage said parts.

In testimony whereof I have hereunto signed my name in the presence of two subscribing witnesses.

JOSEPH O. MORRISON.

Witnesses:
J. C. TEEGARDEN,
BYRON MCMAHAN.